(12) United States Patent
Takahashi et al.

(10) Patent No.: US 9,273,617 B2
(45) Date of Patent: Mar. 1, 2016

(54) CONTROL DEVICE AND CONTROL METHOD OF VEHICLE

(75) Inventors: Kazuma Takahashi, Kamakura (JP); Takayuki Iwasaki, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 987 days.

(21) Appl. No.: 13/393,330

(22) PCT Filed: Dec. 6, 2010

(86) PCT No.: PCT/JP2010/071819
§ 371 (c)(1),
(2), (4) Date: Feb. 29, 2012

(87) PCT Pub. No.: WO2011/089786
PCT Pub. Date: Jul. 28, 2011

(65) Prior Publication Data
US 2012/0153890 A1    Jun. 21, 2012

(30) Foreign Application Priority Data
Jan. 22, 2010 (JP) .................................. 2010-11786

(51) Int. Cl.
*H02J 7/00* (2006.01)
*F02D 29/02* (2006.01)
*F02D 29/06* (2006.01)
*B60L 11/18* (2006.01)

(52) U.S. Cl.
CPC ............. *F02D 29/02* (2013.01); *B60L 11/1861* (2013.01); *F02D 29/06* (2013.01); *Y02T 10/705* (2013.01); *Y02T 10/7005* (2013.01); *Y02T 10/7044* (2013.01)

(58) Field of Classification Search
CPC .................................................... Y02T 10/7005
USPC .................................................... 320/104, 109
See application file for complete search history.

(56) References Cited

U.S. PATENT DOCUMENTS 6,621,250 B1   9/2003   Ohkubo et al.
6,659,213 B2 * 12/2003  Kubo et al. ................. 180/65.26
2010/0152938 A1 * 6/2010  Aoki et al. ....................... 701/22

FOREIGN PATENT DOCUMENTS

| CN | 1387691 A | 12/2002 | | |
|---|---|---|---|---|
| CN | 101678827 A | 3/2010 | | |
| JP | 2001-268708 A | 9/2001 | | |
| JP | 2001-268708 A | * | 9/2001 | ............... H02J 7/00 |
| JP | 2005-180374 A | 7/2005 | | |
| JP | 2008-37268 A | 2/2008 | | |
| JP | 2008-255913 A | 10/2008 | | |

OTHER PUBLICATIONS

Chinese Office Action dated Mar. 5, 2014 (5 pgs.).

* cited by examiner

*Primary Examiner* — Edward Tso
*Assistant Examiner* — Ahmed Omar
(74) *Attorney, Agent, or Firm* — Foley & Lardner LLP (57) ABSTRACT

A control device of a vehicle which device makes a generated voltage of an alternator variable so that a state of charge SOC of a battery installed in the vehicle reaches a control target includes an idle stop permitting SOC setting unit for setting a battery state of charge SOC in which idle stop is permissible, and a battery SOC adjusting unit for reducing and resetting a control target of the battery state of charge SOC in a range beyond the idle stop permitting SOC when a predetermined operation condition holds.

7 Claims, 7 Drawing Sheets

CONTROL DEVICE AND CONTROL METHOD OF VEHICLE

FIELD OF THE INVENTION

This invention relates to a control device and a control method of a vehicle, particularly to a device and a method for controlling a battery SOC (State of Charge) for a vehicle capable of idle stop.

BACKGROUND OF THE INVENTION

A system for varying a generated voltage (charge voltage) of an alternator (generator) according to a running condition of a vehicle is being installed in the vehicle recently. The control system for varying the generated voltage in this way can improve fuel economy by actively charging a battery by increasing the generated voltage during a deceleration fuel cut and reducing the generated voltage to reduce an engine load such as during the acceleration of the vehicle.

In a system of JP2001-268708A, a target SOC during steady running and an idle stop permission determining SOC are changed according to a degree of battery deterioration.

SUMMARY OF THE INVENTION

The lower the target SOC during steady running, the better the charging efficiency due to more charging during the deceleration fuel cut.

However, if the target SOC is reduced to improve the charging efficiency, the idle stop may not be permitted since the target SOC falls below a SOC in which the idle stop can be permitted.

The present invention was developed in view of such a conventional problem and aims to provide a control device and a control method of a vehicle capable of avoiding unnecessary idle stop prohibition.

One aspect of the present invention is directed to a control device of a vehicle which device makes a generated voltage of an alternator variable so that a state of charge SOC of a battery installed in the vehicle reaches a control target, comprising an idle stop permitting SOC setting unit for setting a battery state of charge SOC in which idle stop is permissible; and a battery SOC adjusting unit for reducing and resetting a control target of the battery state of charge SOC in a range beyond the idle stop permitting SOC when a predetermined operation condition holds.

An embodiment of the present invention and advantages thereof are described in detail below with reference to the accompanying drawings.

DESCRIPTION OF THE PREFERRED EMBODIMENTS

Figure 1:
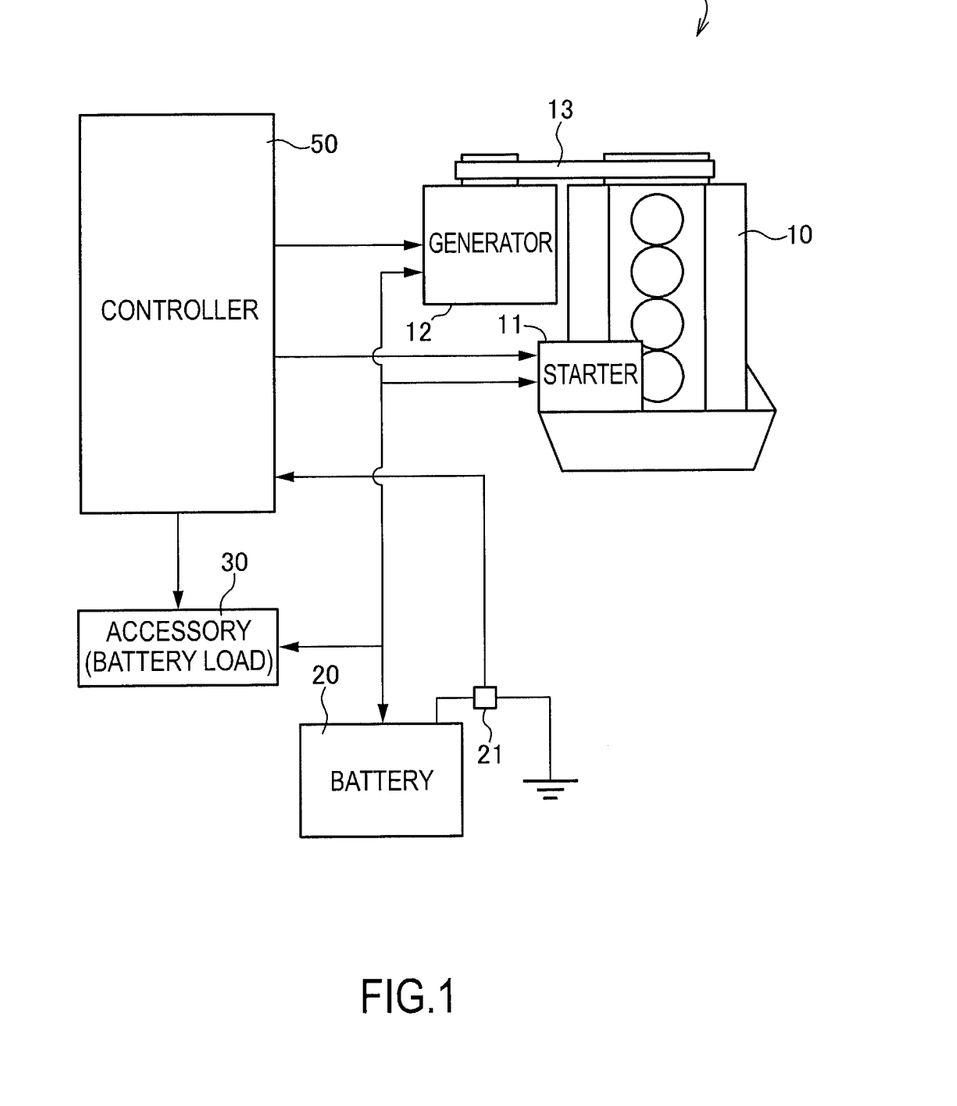
FIG. 1 is a diagram showing an example of a system to which a control device of a vehicle according to the present invention is applicable, FIG. 2 are views diagrammatically showing states of a new battery and a deteriorated battery having the same state of charge SOC.

FIG. 1 is a diagram showing an example of a system to which a control device of a vehicle according to the present invention is applicable.

A system 1 includes an engine 10, a starter 11, a generator 12, a battery 20, an accessory 30 and a controller 50.

The starter 11 starts the engine 10.

The generator 12 is connected to the engine 10 via a belt 13. The generator 12 generates power by engine output.

The battery 20 is charged by the generator 12. The battery 20 supplies power to the starter 11, the generator 12 and the accessory 30 as needed. A current sensor 21 is attached to a negative electrode of the battery 20. This current sensor 21 detects a charge current and a discharge current of the battery. A signal detected by the current sensor 21 is sent to the controller 50. Further, the controller 50 has a function of detecting a terminal voltage (i.e. battery voltage) of the battery 20.

An example of the accessory 30 is a car navigation system. Since there is a possibility of turning off a screen of the car navigation system if a supplied voltage is low, it is necessary to constantly ensure a voltage of a specified level or higher.

The controller 50 receives signals from the current sensor 21 and the like. Then, the controller 50 sends control signals to the starter 11, the generator 12, the accessory 30 and the like. The controller 50 is composed of a microcomputer including a central processing unit (CPU), a read-only memory (ROM), a random access memory (RAM) and an input/output interface (I/O interface). The controller 50 may be composed of a plurality of microcomputers.

(Basic Concept of Present Invention)

As described above, a system for varying a generated voltage (charge voltage) of an alternator (generator) according to a running condition of a vehicle is recently being installed in the vehicle. The control system for varying the generated voltage in this way can improve fuel economy by actively charging a battery by increasing the generated voltage during a deceleration fuel cut and reducing the generated voltage to reduce an engine load such as during the acceleration of the vehicle.

It becomes more difficult for a charge current to flow into the battery as the battery approaches a full state of charge, and the charge current does not flow thereinto in the full state of charge. Accordingly, it is preferable to control the state of charge of the battery so as not to reach the full state of charge and, on the other hand, not to reach a zero state of charge.

The battery state of charge SOC is widely used as an index indicating the state of charge of the battery. This state of charge SOC is defined by the following equation (1).

$$SOC = \frac{Cr}{Cf} \quad (1)$$

where:
SOC: battery state of charge
Cr: battery residual capacity [Ah]

Cf: battery full charge capacity [Ah]

Figure 2:
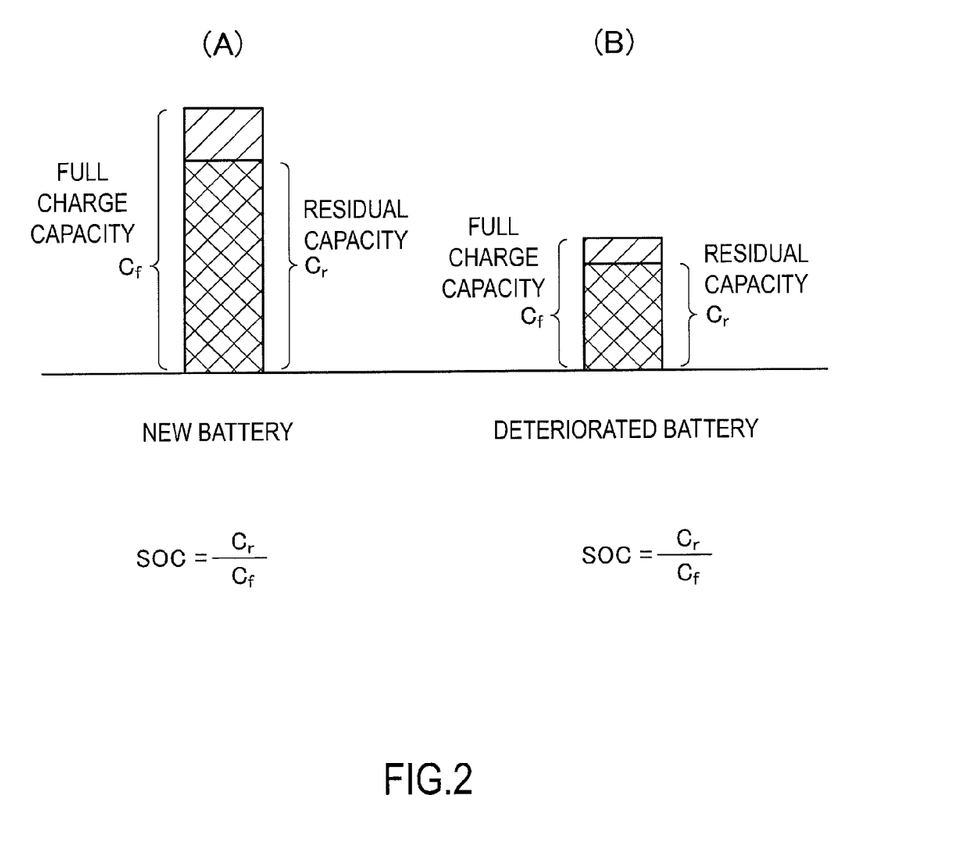

Diagrammatic representation of this is as shown in FIG. 2.

The battery state of charge SOC is defined as described above, but it is difficult to actually detect this.

Accordingly, the magnitude of the state of charge SOC is simply estimated from the magnitude of a battery charge current. That is, if the state of charge SOC is high, it is a state close to the full state of charge and the current is difficult to flow in and becomes lower. Accordingly, it can be estimated that the lower the charge current of the battery, the higher the state of charge SOC. On the other hand, as the state of charge SOC becomes lower, the charge current more easily flows in and becomes higher. Thus, it can be estimated that the higher the charge current of the battery, the lower the state of charge SOC.

The state of charge SOC is estimated in this way, but the battery residual capacity varies depending on a degree of deterioration of the battery even if the state of charge SOC is same. This is because the battery full charge capacity Cf depends on the degree of deterioration of the battery. As shown in FIG. 2(A), the battery full charge capacity Cf is large if the battery is new. On the other hand, as shown in FIG. 2(B), as the battery is more deteriorated, the battery full charge capacity Cf becomes smaller. Note that FIGS. 2A and 2B are views diagrammatically showing states of a new battery and a deteriorated battery having the same state of charge SOC. As is understood from FIGS. 2(A) and 2(B), the battery residual capacity decreases as the battery is more deteriorated even if the state of charge SOC is same. If the starter is started in a state where the battery residual capacity is small, a voltage may largely drop and a car navigation screen may be temporarily turned off.

Accordingly, to ensure good restartability with the deterioration of the battery, the battery state of charge SOC in which the idle stop is permissible needs to be raised.

On the other hand, a control target of the battery state of charge SOC in the control system that makes the generated voltage of the alternator variable is so set in advance that the battery can be charged nearly to the full state of charge by increasing the generated voltage during the deceleration fuel cut. However, if the battery reaches the full state of charge during the deceleration fuel cut, high charging efficiency cannot be obtained. Thus, the control target of the battery state of charge SOC needs to be reduced so that the battery can be more charged.

If the control target SOC is reduced to obtain high charging efficiency in this way and further if the idle stop permitting SOC is raised as the deterioration of the battery progresses, the control target SOC falls below the idle stop permitting SOC, wherefore a state may be reached where the idle stop is not possible.

Accordingly, it is aimed in the present invention to appropriately set an SOC control target. Specific contents are described below.

Figure 3:
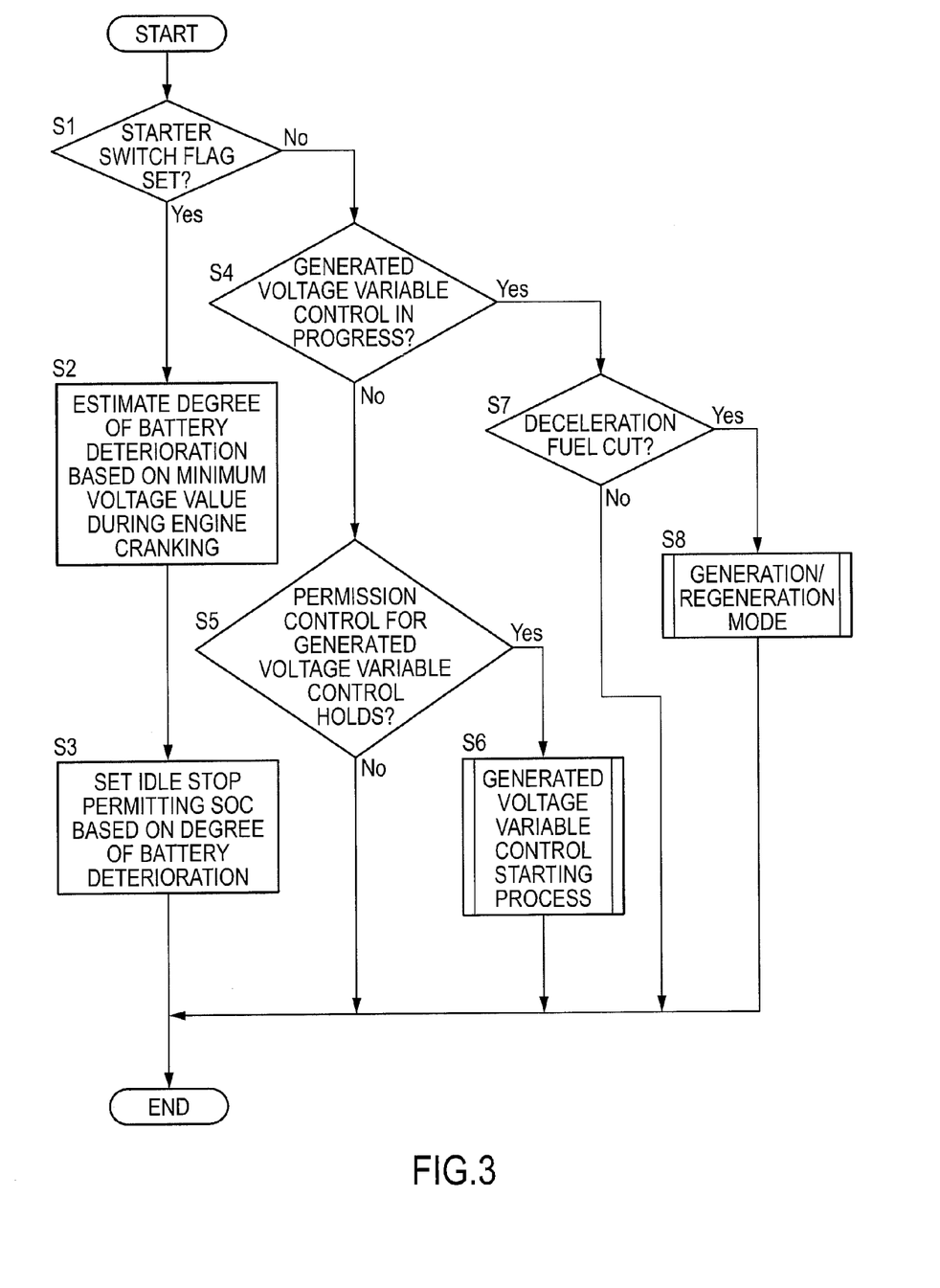
FIG. 3 is a flow chart showing an example of a control logic of a controller.

FIG. 3 is a flow chart showing an example of a control logic of a controller.

The controller 1 repeatedly performs the following process in a very short time cycle (e.g. 10 milliseconds).

In Step S1, the controller determines whether or not a starter switch flag is set. If the starter switch flag is set, the controller proceeds to Step S2. Unless the starter switch flag is set, the controller proceeds to Step S4.

In Step S2, the controller estimates a degree of deterioration of the battery based on a voltage drop during engine cranking. The degree of deterioration of the battery can be estimated based on a maximum battery voltage drop when the engine is cranked. That is, the maximum voltage drop during engine cranking is small if the battery is new, but it increases as the degree of deterioration of the battery progresses. Accordingly, a relationship between the maximum voltage drop during engine cranking and the degree of deterioration of the battery is obtained by an experiment and mapped in advance. If the maximum voltage drop during engine cranking is applied to this map, the degree of deterioration of the battery can be estimated.

In Step S3, the controller sets the idle stop permitting SOC according to the degree of deterioration of the battery.

In Step S4, the controller determines whether or not a generated voltage variable control is in progress. Unless the generated voltage variable control is in progress, the controller proceeds to Step S5. If the generated voltage variable control is in progress, the controller proceeds to Step S7.

In Step S5, the controller determines whether or not a permission condition for the generated voltage variable control holds. Since the battery state of charge SOC becomes lower due to the driving of the starter during engine cranking after engine cranking, the alternator generated voltage is maximized. If the battery state of charge SOC reaches a state close to the full state of charge, the generated voltage variable control is permitted. Unless the permission condition for the generated voltage variable control holds, the controller temporarily exits from the process. If the permission condition for the generated voltage variable control holds, the controller proceeds to Step S6.

In Step S6, the controller performs a generated voltage variable control starting process. Specific contents are described later.

In Step S7, the controller determines whether or not the deceleration fuel cut is in progress. Unless the deceleration fuel cut is in progress, the controller temporarily exits from the process. If the deceleration fuel cut is in progress, the controller proceeds to Step S8.

In Step S8, the controller performs a generation/regeneration mode. Specific contents are described later.

Figure 4:
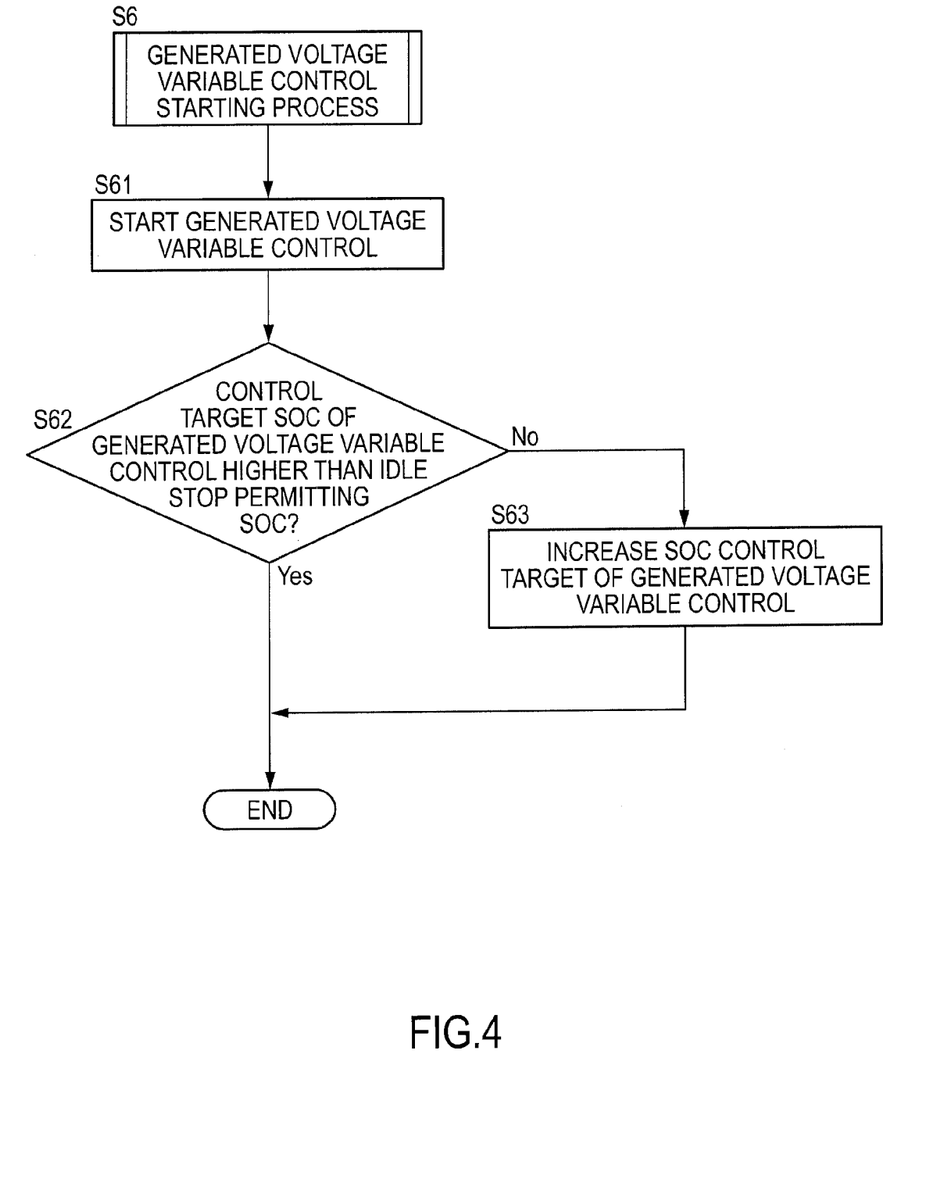
FIG. 4 is a flow chart showing an example of a control logic of a generated voltage variable control starting process.

FIG. 4 is a flow chart showing an example of a control logic of the generated voltage variable control starting process.

In Step S61, the controller starts the generated voltage variable control. That is, the generated voltage of an alternator 12 is made variable so that the state of charge SOC of the battery 20 reaches a predetermined control target. Specifically, the generated voltage of the alternator 12 is reduced if the state of charge SOC exceeds the SOC control target while being increased if the state of charge SOC falls below the SOC control target.

In Step S62, the controller determines whether or not the SOC control target for the generated voltage variable control is higher than the idle stop permitting SOC. The controller temporarily exits from the process if the SOC control target for the generated voltage variable control is higher than the idle stop permitting SOC. The controller proceeds to Step S63 unless otherwise. A final value of the last operation is used as the SOC control target here and, in the case of the first operation, a target value set in advance is used to be optimal in improving fuel economy. Further, the SOC target value has an upper limit SOC and a lower limit SOC with a basic SOC as a center (see FIGS. 6 and 7).

In Step S63, the controller increases the SOC control target of the generated voltage variable control by a predetermined amount so as to exceed the idle stop permitting SOC.

Figure 5:
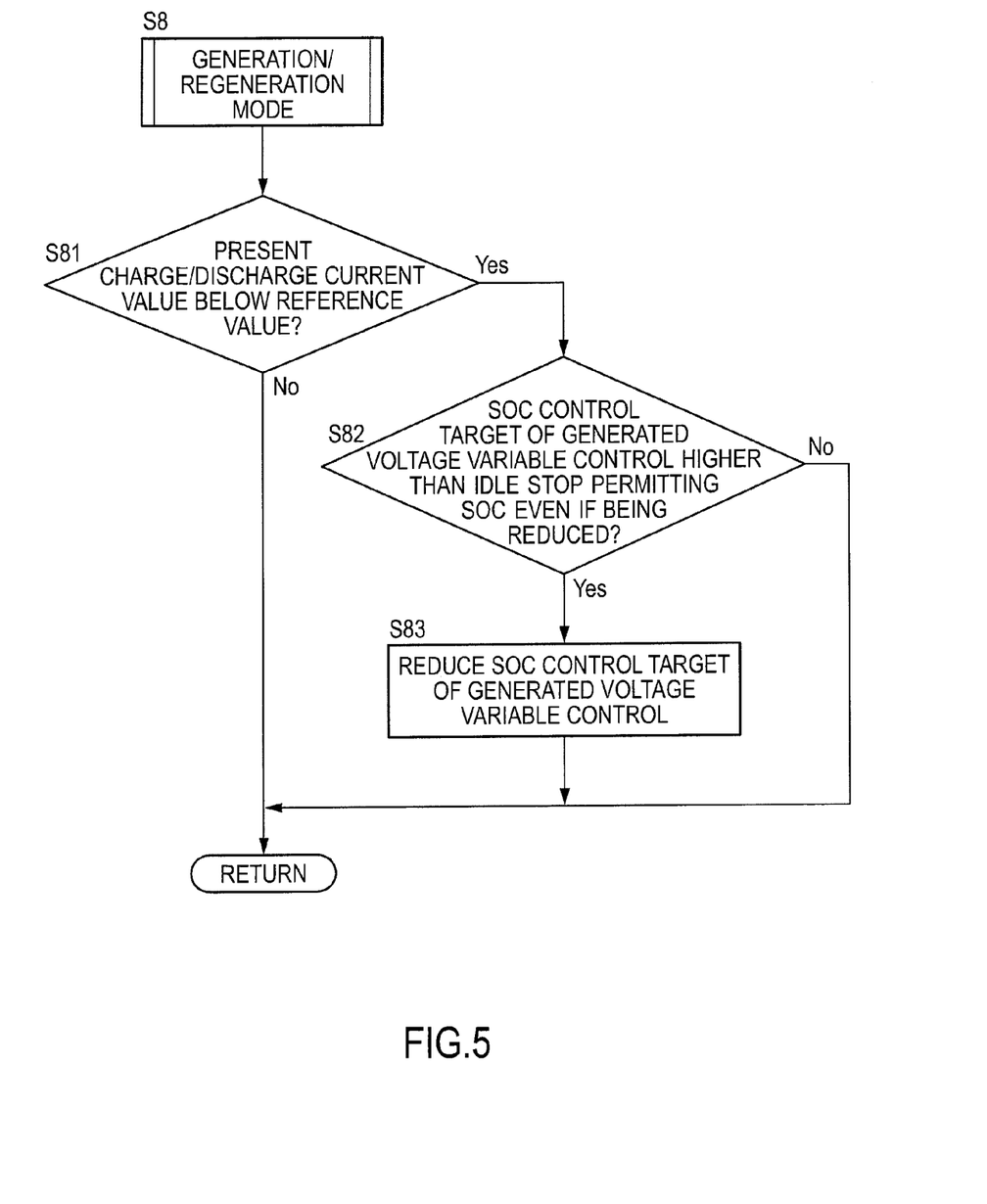
FIG. 5 is a flow chart showing an example of a control logic of a generation/regeneration mode.

FIG. 5 is a flow chart showing an example of a control logic of the generation/regeneration mode.

In Step S81, the controller maximizes the generated voltage of the alternator 12 and determines whether or not the battery has been charged nearly to the full state of charge during the deceleration fuel cut, i.e. whether or not the present charge/discharge current value has fallen below a reference value. The controller temporarily exits from the process until the present charge/discharge current value falls below the reference value. The controller proceeds to Step S82 if the present charge/discharge current value falls below the reference value.

In Step S82, the controller determines whether or not the SOC control target of the generated voltage variable control is higher than the idle stop permitting SOC even if being reduced. If the control target is higher, the controller proceeds to Step S83. Unless the control target is higher, the controller temporarily exits from the process. Note that a reduction amount of the SOC control target is set at a constant value in advance.

In Step S83, the controller reduces the SOC control target of the generated voltage variable control.

Figure 6:
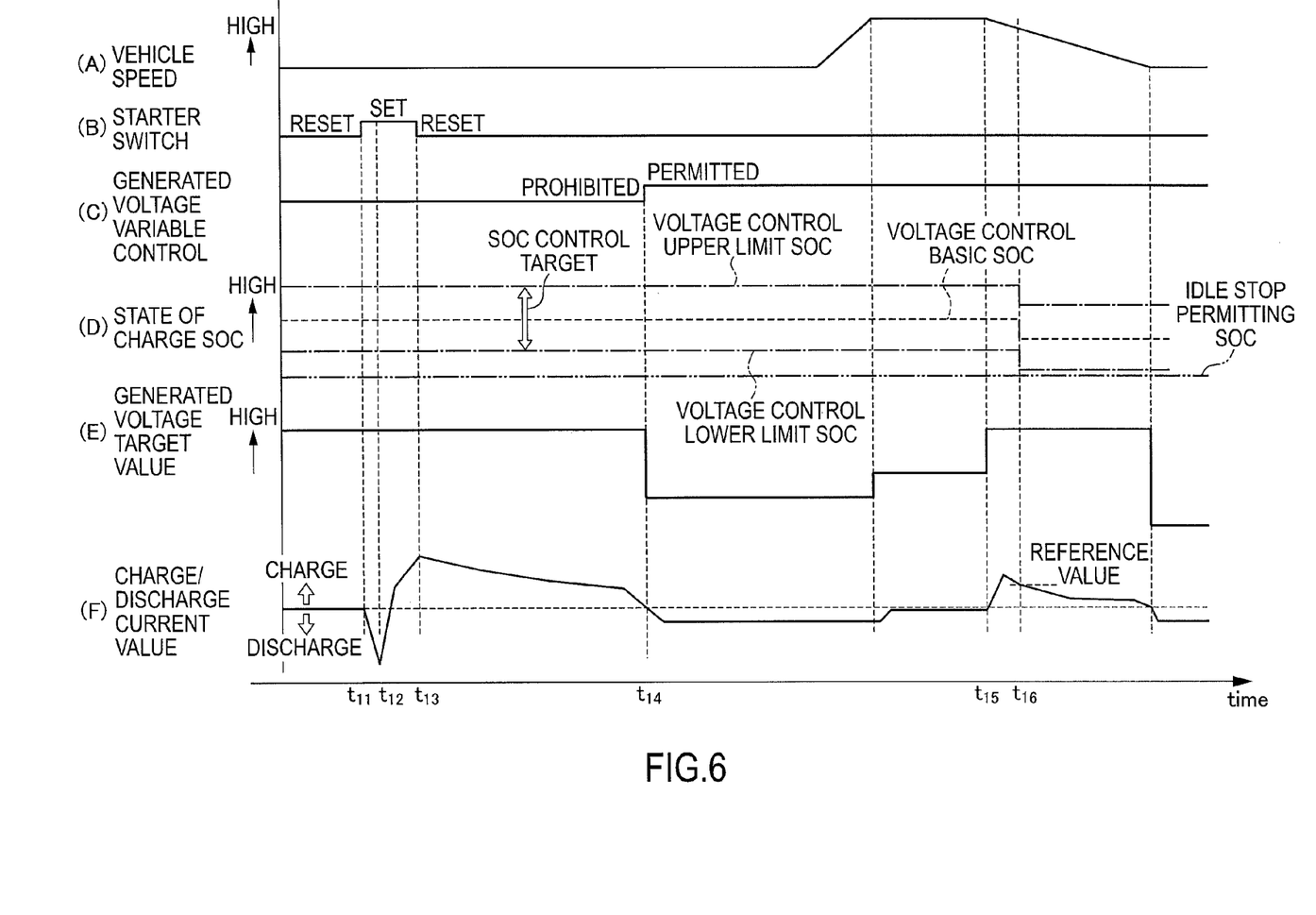
FIG. 6 is a timing chart showing operations when the control logic is executed in a state where a battery is not deteriorated.

FIG. 6 is a timing chart showing operations when the control logic is executed in a state where the battery is not deteriorated.

To facilitate correspondence with the above flow chart, S is added to Step numbers of the flow chart.

The above control logic is executed and the following operations are performed.

In a state where a starter switch is not set (FIG. 6(B)) and the generated voltage variable control is not started (FIG. 6(C)), the controller repeatedly performs Steps S1-->S4-->S5.

When the starter switch is set at time t11 (FIG. 6(B); Yes in Step S1), the controller obtains the degree of deterioration of the battery based on a minimum battery voltage value (maximum voltage drop) during engine cranking (Step S2). The voltage value during engine cranking is minimized at time t12 and the degree of deterioration of the battery is obtained. Then, the idle stop permitting SOC is set according to the degree of deterioration of the battery (FIG. 6(D); Step S3). Note that the idle stop permitting SOC is maintained in FIG. 6 since there is no change in the degree of deterioration of the battery.

When the starter switch is reset at time t13 (FIG. 6(B); No in Step S1), the controller repeatedly performs Steps S1-->S4-->S5.

When the permission condition for the generated voltage variable control holds at time t14 (FIG. 6(C); Yes in Step S5), the generated voltage variable control is started (Steps S6-->S61) and the generated voltage (charge voltage) of the alternator (generator) is varied so that the state of charge SOC of the battery 20 reaches the control target (FIG. 6(E)). In the next and subsequent cycles, the controller repeatedly performs Steps S1-->S4-->S7.

When a deceleration fuel cut state is reached at time t15 (FIG. 6(A); Yes in Step S7), the controller proceeds with the process in Steps S1-->S4-->S7-->S8-->S81. The generated voltage of the alternator is maximized (FIG. 6(E)).

If the battery is nearly fully charged and the present charge/discharge current value falls below the reference value at time t16 (FIG. 6(F); Yes in Step S81) and the SOC control target of the generated voltage variable control is higher than the idle stop permitting SOC even if being reduced (Yes in Step S82), the SOC control target of the generated voltage variable control is reduced (FIG. 6(D); Step S83).

Figure 7:
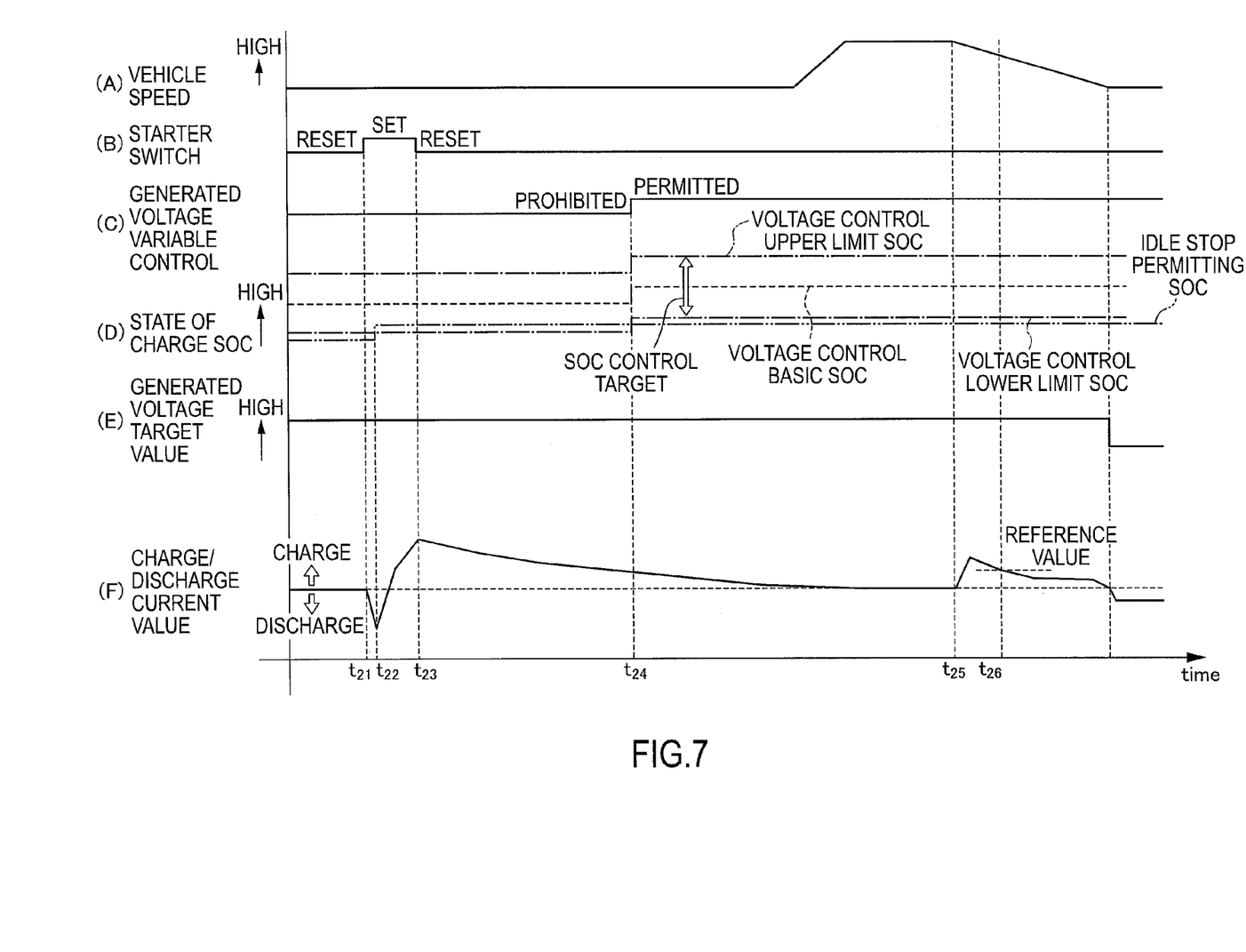
FIG. 7 is a timing chart showing operations when the control logic is executed in a state where the battery is deteriorated.

FIG. 7 is a timing chart showing operations when the control logic is executed in a state where the battery is deteriorated.

In a state where the starter switch is not set (FIG. 7(B)) and the generated voltage variable control is not started (FIG. 7(C)), the controller repeatedly performs Steps S1-->S4-->S5.

When the starter switch is set at time t21 (FIG. 7(B); YES in Step S1), the controller obtains the degree of deterioration of the battery based on a minimum battery voltage value during engine cranking (Step S2). The voltage value during engine cranking is minimized and the degree of deterioration of the battery is obtained at time t22. Then, the idle stop permitting SOC is reset according to the degree of deterioration of the battery (FIG. 7(D); Step S3).

When the starter switch is reset at time t23 (FIG. 7(B); No in Step S1), the controller repeatedly performs Steps S1-->S4-->S5.

When the permission condition for the generated voltage variable control holds at time t24 (FIG. 7(C); Yes in Step S5), the generated voltage variable control is started (Steps S6-->S61). As is clear from FIG. 7(D), the SOC control target of the generated voltage variable control is partly below the idle stop permitting SOC (No in Step S62). Accordingly, the SOC control target of the generated voltage variable control is increased (FIG. 7(D); Step S63). In the next and subsequent Steps, the controller repeatedly performs Steps S1-->S4-->S7.

When a deceleration fuel cut state is reached at time t25 (FIG. 7(A); Yes in Step S7), the controller proceeds with the process in Steps S1-->S4-->S7-->S8-->S81.

The battery is nearly fully charged and the present charge/discharge current value falls below the reference value at time t26 (FIG. 7(F); Yes in Step S81), but the SOC control target of the generated voltage variable control does not exceed the idle stop permitting SOC (No in Step S82) if being reduced. Thus, the SOC control target of the present generated voltage variable control is not changed (FIG. 7(D)).

According to this embodiment, the control target of the battery state of charge SOC is set to exceed the idle stop permitting SOC. By doing so, it can be avoided that the idle stop is unnecessarily prohibited.

Further, if the control target of the battery state of charge SOC is above the idle stop permitting SOC even if being reduced, the control target of the battery state of charge SOC is reduced and reset. By doing so, high charging efficiency can be obtained.

The embodiment of the present invention has been described above. The above embodiment is mere illustration of a part of an application example of the present invention and not of the nature to limit the technical scope of the present invention to the specific construction of above embodiment.

For example, although the reduction amount of the SOC control target is set at the constant value in advance in the above embodiment, it may be changed such as according to the state of charge SOC.

Although the vehicle using only the engine as a drive source is illustrated in the above embodiment, a so-called hybrid vehicle using an engine and an electric motor in combination may be used.

Further, the generator is not limited to the alternator and may be an SSG (Side Mount Starter Generator) having an alternator function and a starter function.

Although the SOC control target has the upper limit value SOC and the lower limit value SOC and the SOC control target is increased if the SOC target partly falls below the idle stop permitting SOC in the above embodiment, the lower limit value SOC of the SOC control target may be set at the idle stop permitting SOC.

The present application claims a priority based on Japanese Patent Application No. 2010-11786 filed with the Japan Patent Office on Jan. 22, 2010, all the contents of which are hereby incorporated by reference.

The invention claimed is:

1. A control device of a vehicle, the control device configured to change a generated voltage of an alternator so that a state of charge SOC of a battery becomes a control target, the battery being mounted on the vehicle, the control device comprising:
    an idle stop permitting SOC setting unit configured to set a state of charge SOC of the battery above which idle stop is permissible; and
    a battery SOC adjusting unit configured to reset a control target of the state of charge SOC of the battery so as to be reduced in orange beyond the idle stop permitting SOC when a regeneration mode for the alternator is performed.

2. The control device according to claim 1, wherein:
    the battery SOC adjusting unit charges the battery by power generation of an alternator during a deceleration fuel cut, and
    the battery SOC adjusting unit resets the control target of the state of charge SOC of the battery so as to be reduced in the range beyond the idle stop permitting SOC when the battery is charged nearly to a full state of charge in the middle of the deceleration fuel cut.

3. The control device according to claim 1, further comprising a battery deterioration estimating unit for estimating a degree of deterioration of the battery, wherein:
    the idle stop permitting SOC setting unit resets the idle stop permitting SOC so auk' be raised if the degree of deterioration of the battery progresses.

4. The control device according to claim 3, wherein:
    the battery SOC adjusting unit resets the control target of the state of charge SOC of the battery so as to be raised to exceed the reset idle stop permitting SOC if the control target of the state of charge SOC of the battery is below the reset idle stop permitting SOC.

5. A control device of a vehicle, the control device configured to change a generated voltage of an alternator so that a state of charge SOC of a battery becomes a control target, the battery being mounted on the vehicle, the control device comprising:
    an idle stop permitting SOC setting means for setting a state of charge SOC of the battery above which idle stop is permissible; and
    a battery SOC adjusting means for resetting a control target of the state of charge SOC of the battery so as to be reduced in a range beyond the idle stop permitting SOC when a regeneration mode for the alternator is performed.

6. A control method of a vehicle, the control device changing a generated voltage of an alternator so that a state of charge SOC of a battery becomes a control target, the battery being mounted on the vehicle, the method comprising:
    setting a state of charge SOC of the battery above which idle stop is permissible; and
    resetting a control target of the state of charge SOC of the battery so as to be reduced in a range beyond the idle stop permitting SOC when a regeneration mode for the alternator is performed.

7. The control device according to claim 2, wherein:
    the battery SOC adjusting unit charges the battery by power generation of the alternator during a deceleration fuel cut, and
    the battery SOC adjusting unit resets the control target of the state of charge SOC of the battery so as to be reduced in the range beyond the idle stop permitting SOC when the battery is charged nearly to a full state of charge in the middle of the deceleration fuel cut.

* * * * *